July 23, 1963  L. W. HAASE  3,098,361
METHOD OF PRODUCING CARBON DIOXIDE ICE AND PRODUCT THEREOF
Filed Dec. 4, 1961  2 Sheets-Sheet 1

Inventor:
Ludwig Werner Haase
By Hans Berman
Agent

July 23, 1963 L. W. HAASE 3,098,361
METHOD OF PRODUCING CARBON DIOXIDE ICE AND PRODUCT THEREOF
Filed Dec. 4, 1961 2 Sheets-Sheet 2
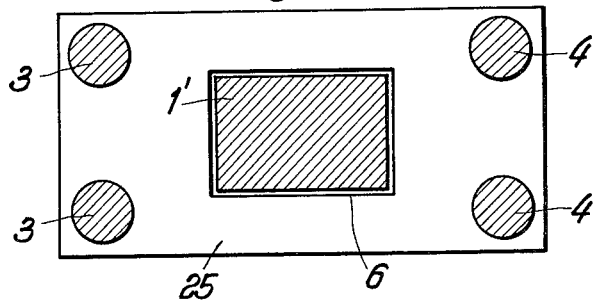
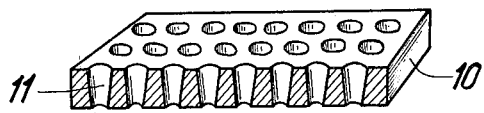
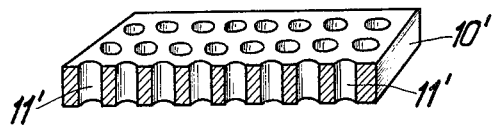
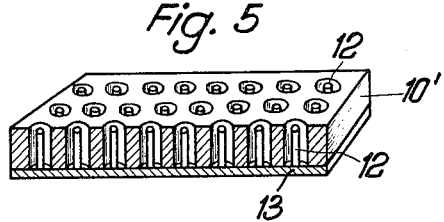
Inventor:
Ludwig Werner Haase
By Hans Berman
Agent United States Patent Office 3,098,361
Patented July 23, 1963

3,098,361
METHOD OF PRODUCING CARBON DIOXIDE
ICE AND PRODUCT THEREOF
Ludwig Werner Haase, Südwestkorso 24a,
Berlin-Wilmersdorf, Germany
Filed Dec. 4, 1961, Ser. No. 156,636
Claims priority, application Germany Aug. 9, 1961
9 Claims. (Cl. 62—1)

This invention relates to a method and apparatus for producing carbon dioxide ice. As employed hereinafter, the term "carbon dioxide ice" designates solid carbon dioxide in the form of shaped solid bodies substantially free from pores.

Solid carbon dioxide is being commercially produced in the form of compacted carbon dioxide snow or "Dry Ice." In the known processes for manufacturing Dry Ice, carbon dioxide is liquefied under pressure and converted to fluffy carbon dioxide snow by sudden expansion, the snow subsequently being mechanically compacted into blocks.

Depending on the compacting pressure applied, the specific gravity of the blocks may be as high as 1.56. Such blocks of Dry Ice, however, are very porous even after considerable mechanical consolidation, and the pores are unevenly distributed. Although an increase in compacting pressure reduces the pore volume, a substantially non-porous and translucent carbon dioxide ice cannot be produced by the afore-described method.

The capillary porosity of conventional Dry Ice causes the rapid absorption of liquid when Dry Ice is thrown into water. Carbon dioxide gas is developed at a high rate over the entire water-carbon dioxide interface which is many times larger than the external surface of the Dry Ice block. The rapidly released gas makes the block buoyant and supports it on the water surface until it is completely evaporated. A large amount of carbon dioxide evaporates without cooling the water to a significant extent.

The known Dry Ice is therefore a convenient and widely used refrigerant for contact with solids and gases, as in storage spaces and refrigerated transport vehicles, but is not commonly employed in many other applications for which carbon dioxide would otherwise be eminently suitable.

Solid carbon dioxide is not being commercially employed, for example, as a propellant in pressure containers equipped with spray nozzles such as aerosol dispensing containers although carbon dioxide can be produced cheaply and has other advantages over the widely used organic propellants such as the several types of fluorocarbons. Carbon dioxide is non-toxic and is soluble not only in many organic solvents, but also in aqueous systems in which the usual organic propellants are practically insoluble. Carbon dioxide can be safely employed for dispensing material intended for human consumption and is an effective propellant for aqueous solutions and emulsions, as well as for many organic liquids. It has preservative effects, and even a sterilizing effect above a certain pressure level.

The solubility of carbon dioxide in many liquid systems affords an important advantage for use in pressure spray containers over permanent gases such as nitrogen for which a relatively large portion of the container space must be reserved if pressures are to be held within manageable limits. Carbon dioxide may be stored in solution in the liquid to be dispensed, and permits expulsion of the entire contents of the dispenser without requiring initial high pressures or a significant amount of storage space.

Carbonated beverages are packed by filling special containers first with a liquid to be discharged by gas pressure, and then introducing carbon dioxide. When the containers are fitted with a valve for controlled discharge of the liquid, they are expensive and not disposable. When disposable containers are adapted for the purpose, they require complex filling apparatus.

It appears attractive to introduce carbon dioxide in the form of lumps of solid carbon dioxide into open atomizing spray containers already holding a liquid charge, and then to seal the containers. The amount of carbon dioxide introduced, however, is critical if complete expulsion of the charge is to be ensured and the bursting strength of the container walls is to be held within reasonable limits. When Dry Ice is added to a liquid at ambient temperature, an uncontrolled amount of carbon dioxide is lost before the container is sealed. If excess carbon dioxide is added in an attempt to compensate for any possible loss, the bursting strength of the container must provide a margin of safety which is not usually practical.

Carbon dioxide therefore has been charged as a propellant to closed containers only until now, and has found very limited application for this purpose for the reasons discussed.

Special filling apparatus is unnecessary, and aerosol cans and similar spray dispensers can be charged with carbon dioxide in a very simple manner prior to sealing when the carbon dioxide is added to the charge in the form of small shaped bodies of substantially non-porous carbon dioxide ice. Such bodies immediately sink to the bottom of liquids of smaller specific gravity. Their carbon dioxide is gasified at a relatively very low rate because the heat transmitting surface of the bodies is limited to their external surface.

When the bodies of carbon dioxide ice are of uniform weight, a precisely determined charge of propellant gas can be provided in a spray container by merely dropping a certain number of ice bodies into the open container already partially filled with the liquid to be dispensed. Carbon dioxide thereafter is evaporated at so slow a rate that the container may be closed without undue haste, and yet no significant amount of propellant gas is lost.

Carbon dioxide ice is also suited for most conventional applications of Dry Ice. Its slower rate of evaporation due to its non-porous structure provides an important advantage in many cases.

It is known to prepare carbon dioxide ice by freezing liquid carbon dioxide, but the known processes are relatively complex and have not been found practical for industrial application on a large scale, where it is desired to produce shaped small bodies of predetermined uniform weight. The known processes also rely on vessels and other equipment capable of sustaining high pressures, and are inherently costly to build and operate.

An object of this invention is the provision of a method of preparing carbon dioxide ice.

A more specific object is the provision of a method for producing small shaped bodies of carbon dioxide ice in a simple and economical manner.

Other objects of this invention and many of the attendant advantages will become apparent to those skilled in the art as the disclosure proceeds.

I have found that a body of conventional Dry Ice, that is, carbon dioxide snow compacted under pressure, can be converted into substantially non-porous carbon dioxide ice by the application of relatively slight mechanical pressure to the Dry Ice when at a temperature closely adjacent the triple point of carbon dioxide, and when a portion of the Dry Ice body is in direct communication with a space in which the pressure is lower than the vapor pressure of carbon dioxide at its triple point.

To transform a body of Dry Ice into carbon dioxide ice, I subject the body in a partly open chamber to mechanical pressure exceeding the vapor pressure of carbon dioxide at the triple point, and preferably not substantially less than 10 kilograms per square centimeter. A mechanical pressure higher than 20 kilograms per square centimeter, however, is not needed and coherent bodies of carbon dioxide ice are difficult to produce at pressures of 50 kilograms per square centimeter or more. Instead of ice bodies, largely unchanged carbon dioxide snow is usually found in the mold when excessive pressure is used. The temperature of the Dry Ice is held close to its triple point by heat transfer through the chamber walls from the ambient atmosphere or from a heater.

The Dry Ice is liquefied by the pressure applied. For use in spray containers as described hereinabove, I prefer to produce small shaped solid bodies of carbon dioxide ice by allowing the liquefied Dry Ice to flow into a mold formed with suitable cavities conforming to the bodies that are to be produced.

A preferred type of apparatus suitable for carrying out the method of my invention is illustrated in the annexed drawing in which:

FIG. 2 is a sectional view of the apparatus of FIG. 1 taken on the line II—II;

FIG. 3 shows a mold insert for use with the apparatus of FIG. 1, the view being perspective, partly sectional, and on a scale larger than that of FIG. 1; and FIGS. 4 and 5 illustrate alternative mold inserts in views corresponding to that of FIG. 3.

Figure 1:
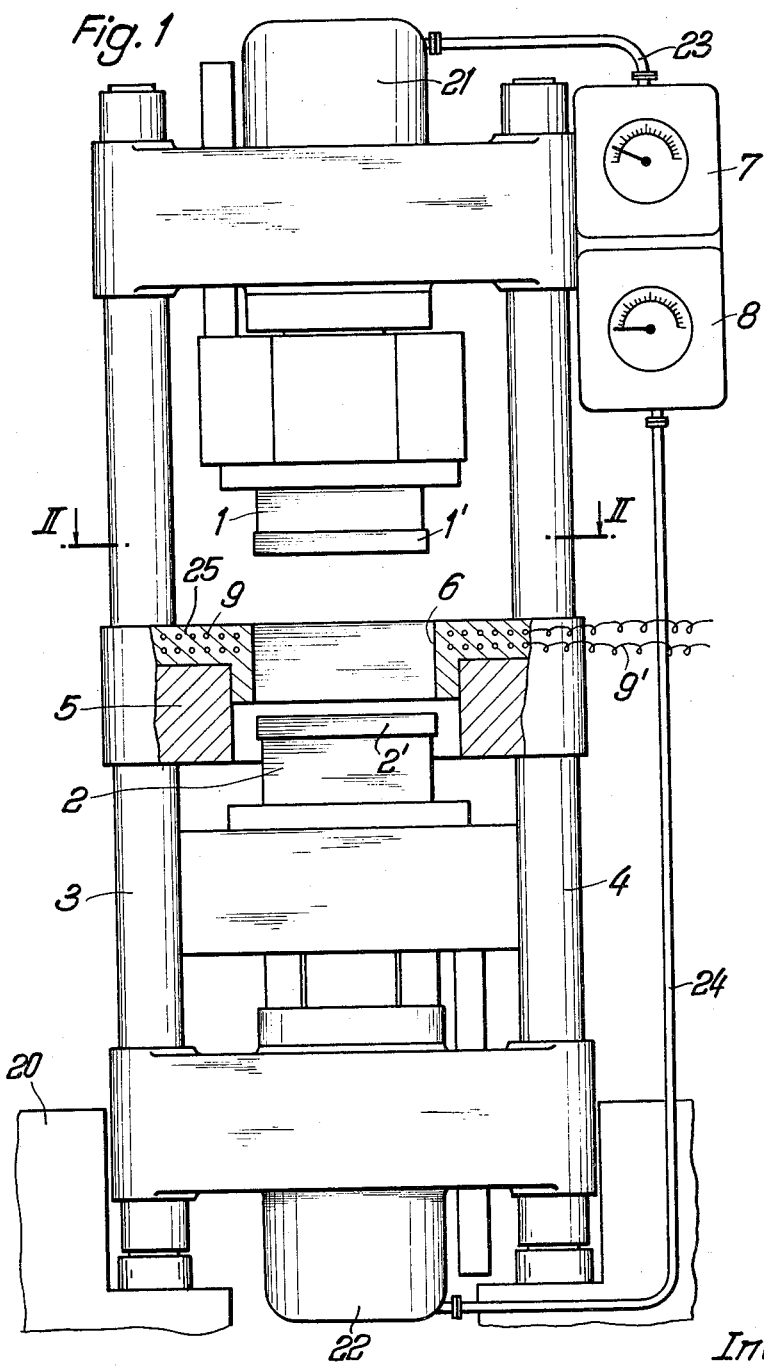
FIG. 1 shows the eccential working elements of the apparatus in front elevation.

Referring now to the drawing in detail, and initially to FIGS. 1 and 2, there is shown a hydraulic press having a base 20 only partly visible in FIG. 1, and not shown in FIG. 2. Four columns 3, 4 fixedly carry an upper hydraulic cylinder 21 and a lower hydraulic cylinder 22. Opposite rams 1 and 2 are moved outward or inward of the cylinder 21, 22 respectively when pressure fluid is admitted to the latter, and toward and away from each other. The movement of the rams is guided parallel to the columns 3, 4. The hydraulic cylinders 21, 22 are connected to a conventional source of hydraulic fluid by check valves and two independent control valves in a manner well known in itself and not further illustrated. The cylinders are connected to respective pressure gauges 7, 8 by conduits 23, 24.

A frame 5 is fixedly mounted on the columns 3, 4 intermediate the cylinders 21, 22 and carries a mold member 25 which defines a cavity 6 of uniform rectangular cross section. The mold cavity 6 is open at the top and the bottom, and adapted to receive the outer face portions 1', 2' of the rams 1, 2. The face portion 2' conforms to the mold cavity 6 and closes the bottom of the cavity when inserted therein. The face portion 1' of the upper ram 1 is of rectangular shape, but smaller than the cavity 6 so as to leave a gap between the ram portion 1' and the mold 25 when the ram portion enters the mold cavity. This is best seen in FIG. 2. The cross sectional shape of the mold cavity 6 may be other than rectangular, but the lower ram face 2' should conform to the mold, and the upper ram face 1' should fit the mold cavity with some clearance regardless of the actual configuration. The mold shape and size should preferably be adapted to the shape and size of the available blocks of compacted Dry Ice as will become apparent presently.

The mold member 25 is equipped with embedded turns of suitably insulated resistance wire which is connected to a source of electric potential by leads 9', and constitutes a heater for raising the temperature of the mold member 25 and of material held in the cavity 6.

The apparatus described above is operated as follows:

The ram 2 is raised from the position illustrated in FIG. 1 until its top face portion 2' is at least flush with the bottom of the mold member 25 and closes the open lower end of the cavity 6. A block of ordinary Dry Ice is then placed into the cavity 6, and the ram 1 is lowered by suitably actuating the controls of the hydraulic system until the bottom face plate 1' abuts under pressure against the block of Dry Ice.

Since the press initially is at ambient temperature, say 18 to 20° C., the Dry Ice vaporizes rapidly in contact with the relatively warm metal parts of the press. The gaseous carbon dioxide formed can escape upward through the gap between the mold member 25 and the ram face portion 1'. When the first block of Dry Ice is consumed and the upper ram 1 touches the lower ram 2, the ram 1 is raised, another block of Dry Ice is placed on the ram face portion 2', and the mold cavity 6 is again closed. This process is repeated and Dry Ice is added, until the ram face portions 1', 2' and the other internal walls of the cavity 6 reach a temperature only slightly lower than the triple point of carbon dioxide, which is at −56.6° C.

The proper mold temperature can be ascertained in a conventional manner by means of thermocouples arranged in suitable wells in one or several of the elements which enclose the cavity 6, but reaching of the correct operating temperature is indicated by the sudden appearance of plates or sheets of nearly clear carbon dioxide ice which are extruded from the gap between the face portion 1' of the top ram 1 and the mold member 25 if the pressure applied by the rams is at least slightly higher than the vapor pressure of carbon dioxide at the triple point, namely higher than about 5.11 atmospheres. For practical purposes, this pressure should not be much lower than 10 atmospheres gauge pressure in order to compensate for pressure losses due to internal friction in the Dry Ice block. For the purposes of this invention, an atmosphere is a pressure equal to one kilogram per square centimeter.

This pressure which may be read from the gauges 7, 8 is preferably raised initially to about 10 atmospheres but not higher than 20 atmospheres by admitting fluid to the cylinders 21, 22. When proper conditions of transformation of Dry Ice into carbon dioxide ice are reached, a steep spontaneous pressure rise is observed. The Dry Ice block is subjected to mechanical disintegration and is transformed. When this pressure rise has appeared, the upper ram 1 is retracted and the lower ram 2 is raised until its outer face portion 2' is at least flush with the top of the mold member 25.

A translucent block of carbon dioxide ice practically free of capillary pores is found on the face portion 2' of the lower ram 2. The ice block shows a granular structure in which fine white boundary lines are discernible. They are believed to represent traces of unconverted carbon dioxide snow. The block of carbon dioxide ice is readily removed from the top face portion 2' of the ram 2 and is ready for storage or use.

Aside from the readily visible change in light transmission properties and the equally obvious absence of pores, the carbon dioxide ice block has a mechanical strength which is greatly superior to that of the Dry Ice block from which it was made. The impact bending strength is increased in a particularly striking manner.

While a complete understanding of the transformation process is not necessary for successfully performing the method of the invention in apparatus of the kind illustrated and described, the following comments are compatible with all known facts, and are believed to provide an adequate and correct explanation of the process:

As soon as the components of the press in direct contact with the Dry Ice block have cooled to the temperature of the triple point of carbon dioxide, the application of mechanical pressure greater than the vapor pressure of carbon dioxide corresponding to this temperature causes liquefaction of carbon dioxide within the Dry Ice block. When the block was highly compacted prior to being introduced into the mold cavity 6, the escape of carbon dioxide gas is retarded sufficiently to raise the pressure of a substantial portion of the Dry Ice block beyond the vapor pressure of the triple point at a rapid rate. At this higher pressure, the thermal energy supplied by conductance from the metal elements of the press causes some of the carbon dioxide to melt.

Liquid carbon dioxide at the triple point has a lower specific gravity than solid carbon dioxide. The expansion resulting from fusion shatters the Dry Ice block from the inside, and some of the liquid carbon dioxide is exuded toward portions of the block which are under lower pressure. Because of the sudden decompression, a portion of the liquid carbon dioxide evaporates and the remainder of the liquid freezes into carbon dioxide ice due to the loss of the heat of evaporation and the drop in pressure.

This mechanism accounts for the sudden extrusion of sheets of translucent, substantially pore-free, solid carbon dioxide from the gap between the upper ram 1 and the mold member 25, and also for the sudden spontaneous pressure rise occurring when the triple point is reached. Atmospheric pressure is restored within the ice block shattered under the sudden pressure rise when a portion of the carbon dioxide suddenly evaporates and the remainder freezes to carbon dioxide ice.

When several blocks of carbon dioxide ice are to be produced consecutively in the mold cavity 6, the precooling of the press elements which define the cavity 6 is, of course, not necessary. It has even been found that heating by ambient air may not be sufficient to hold the temperature within the mold at the triple point temperature, and that the temperature tends to drop further toward the equilibrium temperature of Dry Ice in open air, −78.5° C. Satisfactory carbon dioxide ice blocks are not obtained under such conditions. Instead of a solid block, a granular mass similar to snow is obtained when the pressure is raised above 5.2 atmospheres while the temperature is substantially lower than −56.6° C.

This is believed due to the fact that the transformation of Dry Ice into coherent blocks of carbon dioxide ice is possible only if an intermediate liquid carbon dioxide phase is formed. Liquefaction of carbon dioxide not only requires application of pressure, but also the supply of the necessary heat of fusion. This heat cannot always be obtained from the ambient atmosphere at a sufficient rate through the necessarily heavy walls enclosing the mold cavity 6 in view of the low temperature of the Dry Ice.

For continuous batch operation, I pass sufficient current through the heater 9 to maintain the mold cavity 6 at the desired temperature of approximately −56.6° C. Conventional means used for control of the current flow in the heater may include a heat sensing element in a well of the mold member 25 and a variable rheostat in series circuit with the heater 9 and operated by a servo motor responsive to the signal of the heat sensing element to maintain the temperature in the mold cavity within the desired range. Such an arrangement which is well known in itself and has not been illustrated may further include an amplifier and other means for modifying the sensing element signal, as is conventional.

When the apparatus for producing carbon dioxide ice is intended to provide propellant for spray containers, such as aerosol can packages, I prefer to make a multiplicity of small shaped ice bodies rather than a single block of ice in the apparatus shown in FIGS. 1 and 2. Mold inserts suitable for this purpose are shown in FIGS. 3, 4, and 5.

FIG. 3 shows a rectangular mold insert having the same dimensions of length and width as the mold cavity 6 and the top portion 2' of the lower ram 2, but of a height which is substantially smaller than that of the cavity 6. The mold insert consists of a plate 10 provided with vertically elongated downwardly tapering perforations 11 of approximately frusto-conical shape which constitute small individual casting molds or cavities.

The plate 10 is placed on the top face 2' of the bottom ram 2 after the latter has been raised to close the bottom of the cavity 6, and prior to placing a block of Dry Ice in the cavity. The press is then operated in the manner described above until the spontaneous pressure increase is observed. The increased pressure is maintained by relative movement of the rams until the face portion 1' touches the plate 10. Any excess carbon dioxide which would form a continuous sheet on top of the plate 10 is thereby vaporized. After completion of the operation, the perforations 11 are found filled with almost clear carbon dioxide ice cones which are readily ejected from the plate 10.

The perforations 11 may of course have any desired shape. When the shaped ice bodies produced are to be used in precisely measured amounts, all perforations are made of equal dimensions as shown in FIG. 3.

FIG. 4 shows a plate 10' formed with cylindrical perforations 11' in which rod shaped carbon dioxide ice bodies are formed in the same manner as described in connection with FIG. 3.

The plate 10' may be combined with an auxiliary mold insert as shown in FIG. 5, the auxiliary insert consisting of a thin metal sheet 13 equipped with pins 12 coaxial with the cylindrical perforations 11' when the sheet 13 is conformingly inserted in the cavity 6 between the ram face portion 2' and the plate 10'. The pins 12 constitute casting cores. The tubular carbon dioxide bodies produced in the mold of FIG. 5 have greater specific surface area than the cylindrical rods made in the mold insert illustrated in FIG. 4, and have a faster cooling effect when immersed in a liquid. Other modifications of mold shapes will readily suggest themselves to those skilled in the art on the basis of the above teachings.

Quite surprisingly, it has been found that the carbon dioxide ice produced as described above has a specific gravity of 1.32 to 1.34 although it is practically free of pores. This specific gravity value is substantially lower than the commonly accepted value of 1.512 determined on conventionally prepared solid carbon dioxide.

The specific gravity of carbon dioxide ice bodies of the invention is readily determined from the weight of a large number of individual bodies and their known volume which can be accurately found from the dimensions of the perforations 11, 11' of the mold inserts 10, 10' in which they were cast. When several hundred small cones or cylinders are weighed simultaneously in a weighing scoop or the like, the evaporation of carbon dioxide during weighing is so low as not significantly to affect the accuracy of the result.

The apparatus shown in FIGS. 1 and 2 may be operated otherwise than specifically described above without departing from the spirit and scope of this invention, and it may be modified in many details. A press with two independently movable rams has obvious advantages of simplicity and convenience, but the press illustrated would be entirely operative if the ram 1 were fixed in a position in which it closes the top of the cavity 6 except for the gap required for the escape of gases from the mold. The gap itself may be replaced by any other desired means for venting the cavity. Since the carbon dioxide ice does not adhere to the metal walls, it would conversely be possible successfully to operate the apparatus of FIGS. 1 and 2 with the ram 2 fixed in a position in which it closes the bottom of the cavity 6.

It has been found entirely feasible, though somewhat less convenient to completely invert the apparatus shown in FIG. 1 so that the top of the mold is closed by a stationary ram and the bottom is only partly closed by a movable ram. The press arrangement is also operative if neither ram completely seals the mold cavity.

The Dry Ice blocks serving as a starting material may be of the generally available commercial type. Compacting pressures of 250 kilograms per square centimeter and more are commonly employed, and blocks compacted at such pressures are very satisfactory. Blocks produced at lower pressures, however, can also be transformed into carbon dioxide ice. The transformation of commercial Dry Ice into translucent carbon dioxide by the method of my invention is independent of the pressure at which the starting material was produced.

It should be understood, of course, that the foregoing disclosure relates to only preferred embodiments of the invention, and that it is intended to cover all changes and modifications of the examples of the invention herein chosen for the purpose of the disclosure which do not constitute departures from the spirit and scope of the invention set forth in the appended claims.

What I claim is:

1. A solid body of carbon dioxide ice substantially free from capillary pores and having a specific gravity of approximately 1.33.

2. A solid body of carbon dioxide ice substantially free from capillary pores, said body being translucent and having a specific gravity of approximately 1.33.

3. A method of producing carbon dioxide ice substantially free from capillary pores which comprises applying mechanical pressure to compacted carbon dioxide snow in a chamber partly open to the ambient atmosphere while holding the temperature of said snow approximately at the triple point of carbon dioxide, said mechanical pressure exceeding the vapor pressure of carbon dioxide at said triple point.

4. A method as set forth in claim 3, wherein said mechanical pressure is not substantially smaller than 10 kilograms per square centimeter.

5. A method as set forth in claim 4, wherein said mechanical pressure is not substantially greater than 20 kilograms per square centimeter.

6. A method as set forth in claim 3, wherein the temperature of said snow is held at said temperature by thermal energy transmitted from said ambient atmosphere.

7. A method as set forth in claim 3, wherein the temperature of said snow is held at said temperature by externally supplied heat.

8. A method of producing carbon dioxide ice substantially free from capillary pores which comprises applying mechanical pressure to compacted carbon dioxide snow in a chamber partly open to the ambient atmosphere while holding the temperature of said snow approximately at the triple point of carbon dioxide, said mechanical pressure exceeding the vapor pressure of carbon dioxide at said triple point, whereby said carbon dioxide snow is liquefied to form liquid carbon dioxide; and casting said liquid carbon dioxide in a plurality of mold cavities.

9. A method of producing carbon dioxide ice substantially free from capillary pores which comprises applying to one portion of a body of porous Dry Ice a pressure greater than the vapor pressure of carbon dioxide at the triple point thereof while maintaining said body at a temperature substantially equal to the temperature of said triple point, and while keeping another portion of said body at a pressure substantially lower than said vapor pressure and in direct communication with an ambient space.

References Cited in the file of this patent

UNITED STATES PATENTS

| | | |
|---|---|---|
| 1,919,698 | Hessling | July 25, 1933 |
| 1,927,173 | Jones | Sept. 19, 1933 |
| 1,976,777 | Goosman | Oct. 16, 1934 |
| 1,979,556 | Jones | Nov. 6, 1934 |
| 2,005,736 | Field | June 25, 1935 |
| 2,703,964 | Ashley | Mar. 15, 1955 |

FOREIGN PATENTS

| | | |
|---|---|---|
| 805,534 | France | Aug. 22, 1936 |
| 1,226,246 | France | Feb. 22, 1960 |